(12) United States Patent
Grobert et al.

(10) Patent No.: US 8,391,772 B2
(45) Date of Patent: Mar. 5, 2013

(54) GPS AIDED OPEN LOOP COHERENT FOCUSING

(75) Inventors: Paul H. Grobert, Granada Hills, CA (US); William K. Wallace, Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 479 days.

(21) Appl. No.: 12/777,215

(22) Filed: May 10, 2010

(65) Prior Publication Data

US 2011/0275308 A1 Nov. 10, 2011

(51) Int. Cl.
*H04Q 7/20* (2006.01)

(52) U.S. Cl. ... 455/1; 455/456.1; 455/456.2; 455/456.6; 455/426.1; 455/422.1; 342/357.39; 342/352; 342/357.21; 342/357.56

(58) Field of Classification Search ... 455/1, 456.1–457, 455/414.1–414.4, 422.1, 403, 500, 517, 427, 455/428, 429, 12.1, 17, 23; 342/357.39, 342/352, 357.21, 357.56
See application file for complete search history.

(56) References Cited

U.S. PATENT DOCUMENTS

| | | | |
|---|---|---|---|
| 4,734,702 A | | 3/1988 | Kaplan |
| 5,822,429 A | * | 10/1998 | Casabona et al. ............. 380/252 |
| 5,944,770 A | | 8/1999 | Enge et al. |
| 6,388,611 B1 | | 5/2002 | Dillman |
| 2008/0062039 A1 | | 3/2008 | Cohen et al. |
| 2009/0061759 A1 | | 3/2009 | Stoddard et al. |
| 2010/0007554 A1 | * | 1/2010 | Wang et al. ............... 342/357.12 |

OTHER PUBLICATIONS

Dai, et al., *Innovative Algorithms to Improve Long Range RTK Reliability and Availability*, ION NTM 2007, Jan. 22-24, 2007, San Diego, CA, pp. 860-872.

Tang, et al., "A Kinematic Carrier Phase Tracking System for High Precision Trajectory Determination", Preprint ION GPS-94, Salt Lake City, Utah, 1994 (7 pgs.).

Extended European Search Report for European Application No. 11250249.7, Extended European Search Report dated Sep. 13, 2011 and mailed Sep. 20, 2011 (5 pgs.).

* cited by examiner

*Primary Examiner* — Keith Ferguson
(74) *Attorney, Agent, or Firm* — Christie, Parker & Hale, LLP

(57) ABSTRACT

Precision surgical jamming of a target located at a distance uses GPS to coherently focus the jamming energy transmitted from a plurality of nodes. One of the nodes is designated as a master node and the remaining nodes are designated as auxiliary nodes. Each node tracks the carrier phases of satellite signals transmitted by a plurality of GPS satellites relative to a carrier phase of a reference oscillator in the respective node. The master node provides the tracked phase measurements along with its position information to all of the auxiliary nodes. The auxiliary nodes determine the phase offset of its reference oscillator relative to the reference oscillator of the master node based on the transmitted data. The transmit phase of a jammer transmitter in each of the nodes is then aligned to the phase of the reference oscillator to transmit a coherent focused beam to a distant target.

14 Claims, 7 Drawing Sheets

GPS AIDED OPEN LOOP COHERENT FOCUSING

FIELD OF THE INVENTION

This invention relates generally to precision surgical jamming of communication and navigation of a distant target, and more particularly, to a system and method for using GPS to implement such precision surgical jamming.

BACKGROUND OF THE INVENTION

One approach used in electronic warfare to deny communication and navigation services to the enemy is to use high power blanket jamming of a large area. However, such high power blanket jamming can result in electromagnetic interference of friendly forces. A current mechanism to overcome such deficiency is to use a large distributed array of nodes to generate precision jamming to provide surgical projection of coherent RF energy. This allows effective jamming of an intended enemy target without impacting civil services and/or blue force radios or navigation. However, although the use of precision surgical jamming limits collateral effects, it uses closed loop technology that requires beacon devices near the target geographic area of interest (AOI), or within the target AOI. Another drawback to current precision surgical jamming technology is that it uses ultra precision (atomic) clocks to synchronize dispersed clocks used by different jammer transmitters. Such synchronization is needed to coherently focus the jamming energy at the distant target.

It would be beneficial, however, to be able to coherently focus jammer energy at a distant target without the need of beacons collocated at a target and without the need of precision clocks. This would provide war fighters with a system that offers superior operational effectiveness at a lower cost compared to current approaches.

SUMMARY OF THE INVENTION

According to one embodiment, the present invention is directed to a method for generating jamming signals from a plurality of nodes. One of the nodes is designated as a master node and the remaining nodes are designated as auxiliary nodes. Each of the nodes includes a GPS receiver, reference oscillator, frequency synthesizer, and signal transmitter. The GPS receiver in each of the plurality of nodes measures carrier phases of satellite signals transmitted by a plurality of GPS satellites relative to a carrier phase of the reference oscillator in the respective node. The master node provides to the auxiliary nodes, data relating to the measured carrier phases of the plurality of GPS satellites and position information of the master node. Each of the auxiliary nodes determines, based on the data from the master node, a difference of the phase of the reference oscillator of the auxiliary node relative to the phase of the reference oscillator in the master node. A transmit phase of the transmitter in each of the auxiliary nodes is aligned based on the determined phase difference. Each of the plurality of nodes transmits a jamming signal directed to a remote target based on the aligned transmit phase. The energy from the jamming signals are configured to be combined at the remote target for disrupting communication or navigation of the remote target.

According to another embodiment, the present invention is directed to a communications node for generating jamming signals. The communications node includes a data receiver receiving from a master node, data relating to measured carrier phases of a plurality of GPS satellites relative to a carrier phase of a first reference oscillator in the master node, and position information of the master node. The node also includes a GPS receiver and a second reference oscillator that generates a second reference signal at a predetermined frequency. The GPS receiver includes logic to measure carrier phases of satellite signals transmitted by the plurality of GPS satellites relative to a carrier phase of the second reference oscillator, and determine, based on the data from the master node, a difference of a phase of the second reference oscillator relative to a phase of the first reference oscillator in the master node. A jammer frequency synthesizer coupled to the GPS receiver and the second reference oscillator includes logic for aligning a transmit phase based on the determined phase difference. A transmitter coupled to the jammer frequency synthesizer transmits a jamming signal directed to a remote target based on the aligned transmit phase. Energy from the jamming signal is configured to be combined at the remote target with energy from one or more jamming signals from one or more other nodes for disrupting communication or navigation of the remote target.

According to one embodiment of the invention, the determining of the difference of the phase includes determining by each of the auxiliary nodes a position of the auxiliary node relative to the master node;

According to one embodiment of the invention, the determining of the position is based on kinematic carrier phase tracking of the satellite signals.

According to one embodiment of the invention, the plurality of nodes measure the carrier phases of the satellite signals at a predetermined GPS time period determined by the GPS receiver.

According to one embodiment of the invention, the transmitter in each of the plurality of nodes includes a phase lock loop frequency synthesizer driven by the reference oscillator in the node.

According to one embodiment of the invention, the GPS receiver in each of the plurality of nodes includes a phase lock loop to track the carrier phases of the satellite signals driven by the reference oscillator in the node.

According to one embodiment of the invention, the reference oscillator outputs a signal at a frequency of 10.23 MHz.

A person of skill in the art should recognize that the embodiments of the present invention allow coherent focusing of jammer energy at a distant target without using collocated beacons nor precise (atomic) clocks.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
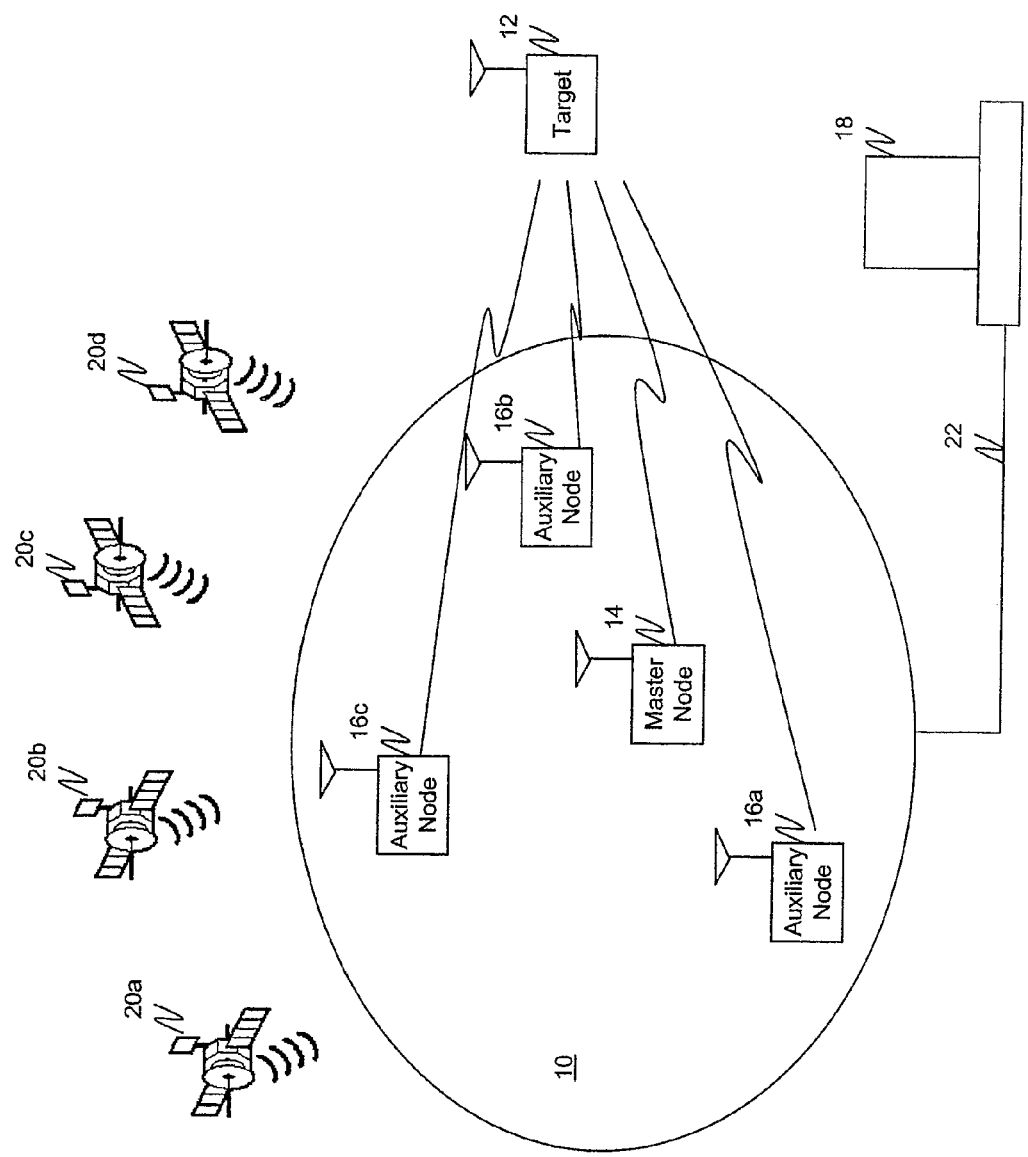
FIG. 1 is a schematic diagram of a system for GPS aided precision jamming according to one embodiment of the invention.

In general terms, embodiments of the present invention are directed to a system and method for using GPS to implement precision surgical jamming of a target located at a distance using a distributed array of nodes. One of the nodes is designated as a master node and the remaining nodes are designated as auxiliary nodes. Each node tracks the carrier phases of satellite signals transmitted by a plurality of GPS satellites relative to the phase of the reference oscillator in the respective node. Using a data link, the master node provides the tracked satellite phase measurements along with its position information to all of the auxiliary nodes. Each auxiliary node determines the phase offset of its reference oscillator relative to the reference oscillator of the master node based on the transmitted data. The transmit phase of a jammer transmitter in each of the nodes is then aligned to the phase of each node's reference oscillator to enable transmitting a coherent focused beam to a distant target.

According to one embodiment, the distributed array of nodes is formed via a swarm of low cost vehicles, where each vehicle uses a low power jamming transmitter to provide a coherent focused beam of jammer energy at the distant target. GPS satellite kinematic carrier phase tracking (KCPT) and position measurements that are shared amongst the nodes provide precise carrier phasing of jamming transmitters. This approach of transmitter phase alignment eliminates the need for precise time alignment amongst the nodes. Co-located active/passive beacons are also no longer required.

Conventional wisdom indicates that the use of GPS to implement precision surgical jamming via a large distributed array is not feasible. This is because the best timing accuracy available using classical GPS receiver techniques is in the order of a few nanoseconds due to the fact that timing in a typical GPS receiver is derived from count-down logic that is driven by a high frequency clock derived from the receiver's reference oscillator. However, the timing accuracy that is needed to synchronize the jamming transmitter phases is in the order of few picoseconds. Picosecond accuracy is currently not provided by typical GPS receivers.

Embodiments of the present invention eliminate the need to derive accurate GPS time at each node. Instead, embodiments of the present invention make use of relative KCPT measurements between nodes and phase of each node's reference oscillator relative to the master node to align the phases of the GPS receivers' reference oscillators. The reference oscillator in each node is also the frequency reference for synthesizing jammer transmitter frequency. Thus, phase alignment is also obtained in the jammer transmitter to coherently combine the jammer transmitter's energy at a distant target.

In this regard, one of the nodes in the distributed array is designated as a master node, and the remaining nodes of the array are designated as auxiliary nodes. Each auxiliary node determines a GPS position relative to the master node. According to one embodiment, KCPT methodology is used to determine the relative position of the auxiliary node to within a few millimeters of the master node. Such position accuracy is desired for synchronizing the phases of the reference oscillators.

As a person of skill in the art will understand, KCPT is a precision navigation technique that uses precision GPS satellite carrier phase measurements to determine a navigation position. The KCPT algorithm measures the carrier phases of all GPS satellites for identifying a position of a GPS receiver within inches in a volume space. Each position in the volume space has a specific combination of carrier phases which are pre-calculated for the position. A measured set of carrier phases are compared against the pre-calculated combinations, and the location of a matched combination of carrier phases is deemed to be the location of the GPS receiver. Further details on the KCPT algorithm is provided by Lien Dai et al., "Innovative Algorithms to Improve Long Range RTK Reliability and Availability," ION NTM 2007, the content of which is incorporated herein by reference.

Based on the relative position information and the satellite carrier phase measurements, the phase of each reference oscillator in an auxiliary node is "aligned" with the phase of the reference oscillator in a master node. The term "align" as used herein does not require that the auxiliary nodes physically adjust the phases of their reference oscillators to match the phase of the master node's reference oscillator, but simply requires each node to have knowledge of a phase offset of its reference oscillator in relation to the master node's reference oscillator.

According to one embodiment of the invention, the "aligning" of an auxiliary node's reference oscillator is within 16 millidegrees of the master node's reference oscillator. Thus, coherent phase alignment of each node's jamming transmitter is possible within a few degrees at a distant target. Specifically, a reference oscillator accuracy of 16 millidegrees translates to only 2.5 degrees of phase error at 1.57542 GHz.

To accomplish accurate phase alignment of the reference oscillators, the following observation is noted. The receivers use a phase lock loop (PLL or Costas loop) to track the GPS satellite carrier signals (reconstructed carrier after PN correlation). The phase of the NCO (digital number controlled oscillator) used to implement the PLL relates directly to the phase of the reference oscillator since the NCO is synchronously driven by the reference oscillator. Although this observation has no significance in the typical GPS receiver, it is one of the key requirements in implementing the GPS aided precision jamming according to the embodiments of the present invention.

According to one embodiment, all nodes make their satellite tracking PLL phase measurements at the same time (e.g. at the GPS 1 second epoch). The master node conveys the phase measurements of the satellites (PLL phases) in relation to the phase of its reference oscillator, to all the auxiliary nodes, via a data link coupled to the nodes. The master also conveys its current GPS position, heading, and velocity. Based on the received information, each auxiliary node can compare its satellite tracking PLL phase measurements with the PLL phases of the master node to determine the phase of its reference oscillator relative to the master node's reference oscillator. Even if not all nodes make their satellite tracking PLL phase measurements at the same time due to a timing error, such timing error is negligible for purposes of aligning the carrier phases of the reference oscillators.

For example, if the satellite phase measurement by a first node is as much as 100 nanoseconds before or after the satellite phase measurement by a second node, the 100 nanosecond error translates to a phase measurement error only around 0.27 degrees (0.15 mm). This is because mixing operations in the GPS receiver translates the high frequency L-band carrier signals (e.g. 1.5 GHz) from the satellites to a low frequency baseband (e.g. 10.23 MHz) leaving only low frequency Doppler offsets as an error term due to user and satellite motion. A phase error (e.g. a 1 degree error) at the high frequency however still translates to be the same phase error (e.g. a 1 degree error) at the low frequency level. The same phase error at the low frequency, however, is negligible because the error is expanded in time. Thus, for a 100 nanosecond measurement time error between nodes and a 1500 meter/second velocity offset (node-to-satellite and vehicle motion), the effective phase measurement error is only≈0.27 degrees (0.15 mm).

Each of the auxiliary nodes use the knowledge of its position relative to the master node and the phase offset between its reference oscillator and the reference oscillator of the master node to align the phase of its jammer transmitter signal to coherently add to the phase of the master node's jamming signal at a distant target. The nodes then transmit a jamming signal directed to a remote target based on the aligned transmit phase. The energy of the jamming signals are configured to be combined at the remote target for disrupting communication or navigation services of the remote target.

FIG. 1 is a schematic diagram of a system for GPS aided precision jamming according to one embodiment of the invention. The system includes a large distributed array (swarm) of airborne and/or ground communications nodes 10 dispatched to a geographic area of interest where a target device 12 may be located. The nodes 14, 16 may be land vehicles, unmanned aerial vehicles, tethered balloons, man-portable ground sites, or other mobile nodes with communication and navigation hardware and software as will be apparent to person of skill in the art.

The target device 12 is any wireless communication and/or navigation device whose wireless communication and/or navigation functions are disrupted and/or controlled via low power jamming signals transmitted by the swarm of nodes. The jamming signals transmitted by the nodes together form a coherently focused beam at the distant target device. The low power energy transmitted by the individual nodes add up coherently to generate the energy needed to disable or disrupt the communication and/or navigation of the distant target device 12.

The nodes of the array 10 include vehicles equipped with communication and navigation processor, memory, hardware, and software for achieving the various functionalites described herein. For example, the nodes are configured to collect satellite carrier phase measurements from one or more GPS satellites 20a-20d (collectively referred to as 20), transmit/receive data signals to/from nodes or a central control device 18, and transmit jamming RF signals to the target 12.

The nodes are also coupled to the central control device 18 over a communications link 22. The communications link 22 may be an infrared data port, a wireless communications link, global communications link such as the Internet, or any other communications medium known in the art. The central control device 18 is a computer equipped with a processor and memory storing computer program instructions for transmitting location information of a target device to the swarm of nodes, the frequency to be jammed, and designating the nodes as master or auxiliary nodes.

According to one embodiment of the invention, one of the nodes of the array 10 operates as a master node 14 in response to data communicated from the central device 18, while the remaining nodes operate as auxiliary nodes 16a, 16b, 16c (collectively referred to as 16). Although any of the nodes may be selected as the master node, it is desirable to select the node in the middle of the swarm of nodes as the master. The master node 14 functions as the reference to which all of the auxiliary nodes 16 will phase align their jamming transmitters. As the reference, the master node 14 transmits a reference node data set at, for example, a 1 Hz rate, which may be conveniently tied, for example, to a 1 second GPS epoch used by the nodes to measure the satellite phases. According to one embodiment, the reference node data set includes position, velocity, and heading of the master node 14, and phases of the tracked GPS satellites 20 as measured by the master node in relation to the phase of its reference oscillator.

Based on the received reference node data set, the auxiliary nodes 16 execute the KCPT algorithm to determine their position to within millimeters of the master node. Based on the knowledge of the position of each auxiliary node in relation to the master node, and the knowledge of the measured phases of its tracked satellites in relation to the measured phases of the tracked satellites by the master node, each auxiliary node 16 can establish the phase of its reference oscillator to within 16 millidegrees phase error of the master node's reference oscillator. This provides the auxiliary nodes 16 a common frame of reference relative to the master node 14 to accurately phase their jamming transmissions. In other words, because each auxiliary node knows its position relative to the target 12 and its position and reference oscillator phase relative to the master node's 14, each auxiliary node can compute the phase alignment required for the jammer transmitter to coherently combine the jamming transmitter's energy at the target.

Figure 2:
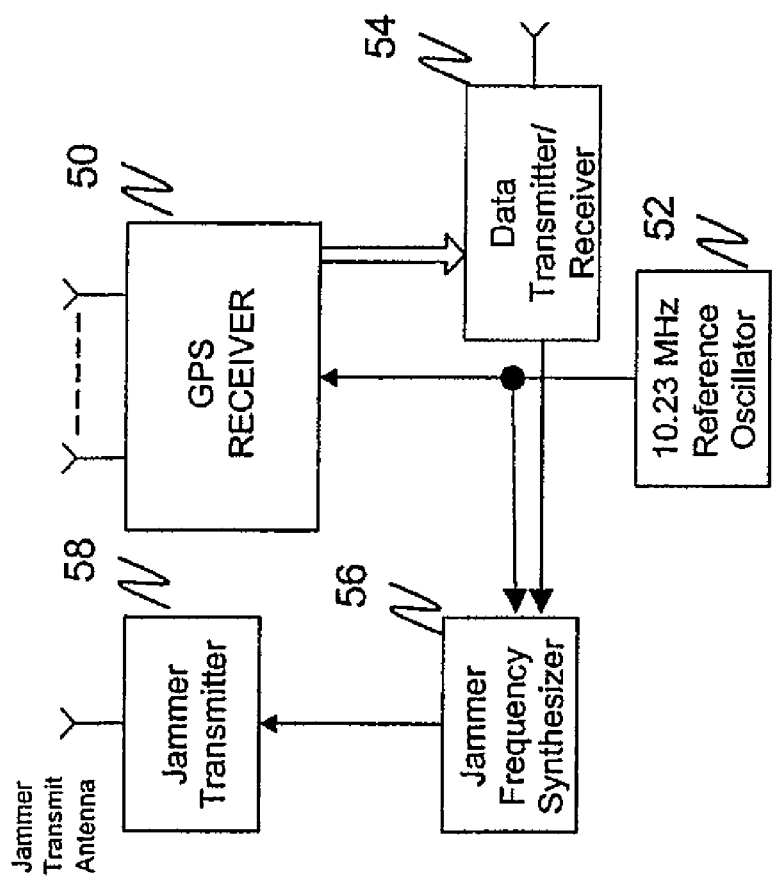
FIG. 2 is a schematic block diagram of a node of a distributed array according to one embodiment of the invention.

FIG. 2 is a schematic block diagram of a node 14 or 16 of the array according to one embodiment of the invention. The node includes a GPS receiver 50 with logic for measuring the carrier phases of each of the satellites 20 at predetermined time periods (e.g. 1 second epoch) and determining a current position of the node via the KCPT algorithm. KCPT is preferred as it allows the auxiliary nodes to determine their position within millimeters of the master node. However, a person of skill in the art will recognize that any other GPS positioning algorithm may be used in lieu of the KCPT algorithm as long as it provides a similar type of position accuracy.

The GPS receiver 50 is coupled to a reference oscillator 52 and data transmitter/receiver 54. Each node further includes a jammer frequency synthesizer 56 for adjusting and maintaining a carrier phase of the jamming transmission via a jamming transmitter 58.

According to one embodiment, the reference oscillator generates reference signals at a frequency of 10.23 MHz. The reference signals that are generated may be sine waves or square waves. The reference oscillator drives both the local NCO in the GPS receiver as well as the jammer frequency synthesizer 56. A person of skill in the art will recognize that other frequencies other than 10.23 MHz may be used in alternative embodiments. Furthermore, although the reference oscillator 52 is illustrated to be separate from the GPS receiver 50, a person of skill in the art will recognize that the reference oscillator may be included as part of the GPS receiver 50.

Depending on the role of each node (i.e. master or auxiliary), the data transmitter/receiver 54 is used to transmit or receive a master node's measured satellite phases along with its position, heading, and velocity information. The heading and velocity information may be calculated via GPS or by an inertial navigation system (which may use the GPS navigation data) and/or gyroscopes which may be separate or part of the GPS receiver. The data transmitter/receiver 54 may also be used to receive data transmitted by the central control device 18.

Figure 3:
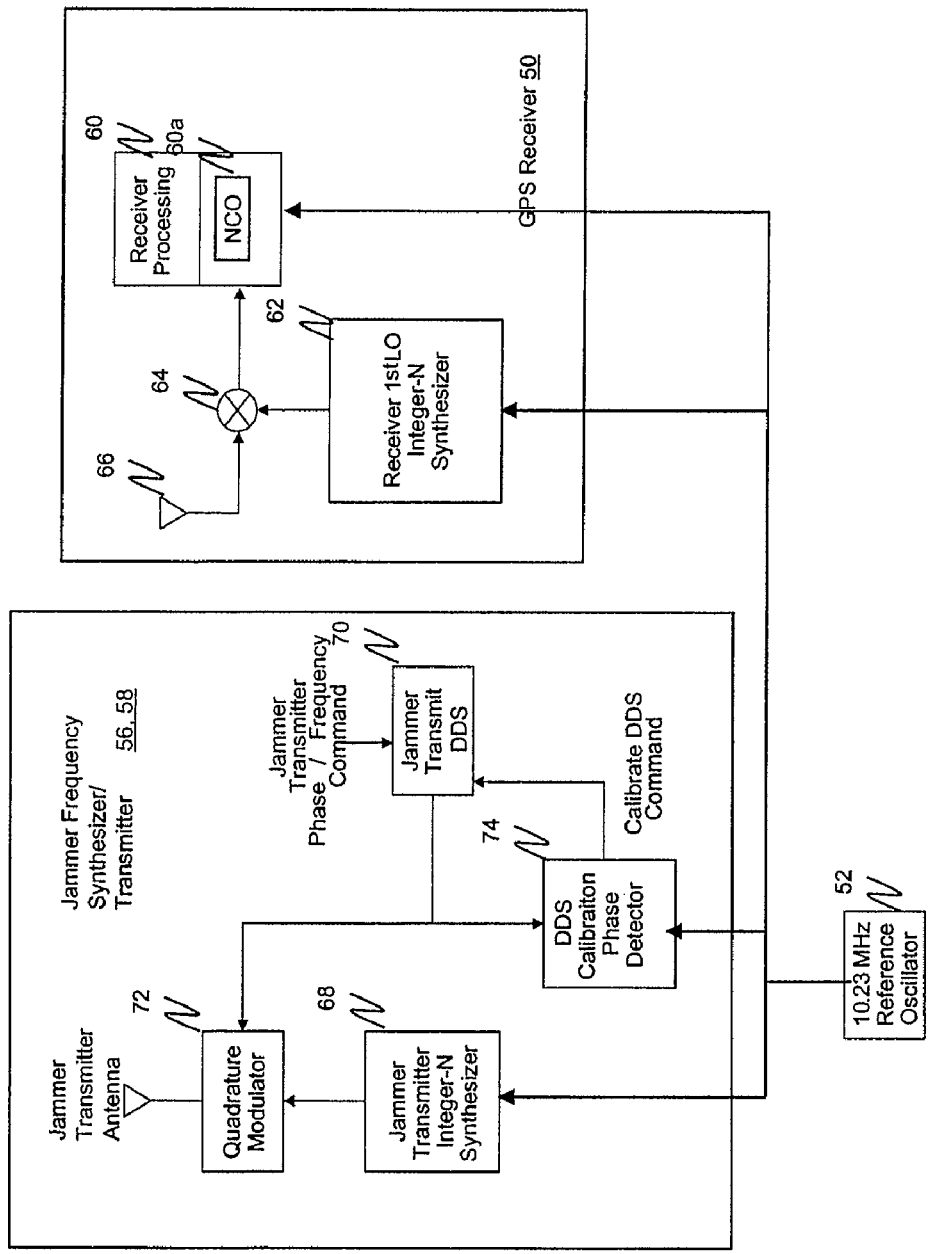
FIG. 3 is a more detailed block diagram of a GPS receiver and jamming transmitter synthesizer/transmitter according to one embodiment of the invention.

FIG. 3 is a more detailed block diagram of the GPS receiver 50 and jamming frequency synthesizer/transmitter 56, 58 according to one embodiment of the invention. The GPS receiver 50 includes an L band GPS receiver antenna 66 receiving, for example, an L1 band signal of 1.57542 GHz from the tracked satellites 20. The GPS receiver 50 further includes an integer N-type phase lock loop synthesizer 62. The synthesizer 62 and the GPS antenna 66 are coupled to a mixer 64 which allows the high frequency L1 band GPS signal to be mixed down to a lower frequency baseband signal. The lower frequency baseband signal is applied to a receiver processing logic 60 which includes an NCO 60a and a PLL. NCO 60a is used for PLL (Costas) tracking of the down-converted GPS carrier signal. The receiver processing logic 60 further includes PN correlation and PN code tracking logic which allows the reconstructing of the satellite carrier signal. The PLL, using the NCO 60a, typically provides a tracking error of 2.5 degrees RMS (1.5 mm) which equates to a 2.5 degrees RMS (1.5 mm) tracking error at the GPS L1 frequency (i.e., 1.57542 GHz). Typically, a 2.5 degree RMS tracking error is achieved in a GPS receiver for a nominal satellite signal C/No level of 40 db-Hz. The 2.5 degrees RMS phase error of the NCO 60a equates to about 16 millidegrees of phase knowledge of the 10.23 MHz reference oscillator 52 since the NCO 60a is synchronously clocked by the reference oscillator 52. This relationship is a consequence of the 154:1 ratio of the GPS satellite carrier frequency to the frequency of the GPS receiver's reference oscillator 52. Therefore, all auxiliary nodes can determine the phase of their reference oscillator 52 within 16 millidegrees of the master node's reference oscillator, despite the 2.5 degree phase error at the higher L1 frequency.

The GPS receiver includes receiver processing logic 60 for performing various navigation processing functions. For example, the processing logic 60 may be configured to output the measured phases of the tracked satellites 20 relative to the phase of its reference oscillator 52. The receiver processing logic may also be configured to execute the KCPT algorithm to identify a geographic position of the node relative to the master node, as well as determine the node's velocity, heading, and the like.

According to one embodiment of the invention, the jammer frequency synthesizer/transmitter 56, 58 includes an integer-N type phase lock loop synthesizer 68 (jammer integer-N synthesizer) similar to the integer-N synthesizer in the GPS receiver 50. An integer-N type synthesizer is preferred over a fractional N frequency synthesizer for the jammer frequency synthesizer because a fractional N frequency synthesizer has many possible starting phases at power-up which would result in unknown phases between vehicles. On the other hand, an integer-N type synthesizer allows the output phase of the jammer transmit synthesizer signal (i.e., zero crossing of jammer transmit signal) to be aligned with the phase of the reference oscillator 52 (i.e., zero crossing of reference oscillator signal). In this regard, the jammer integer-N synthesizer 68 is also driven by the reference oscillator 52. Accordingly, the frequency step of the jammer integer-N synthesizer is an integer multiple of the frequency of the reference oscillator (e.g. 10.23 MHz). In other embodiments, the signals from the jammer frequency synthesizer and reference oscillator are square waves where the square wave signals' "rising edges" are aligned.

According to one embodiment, a frequency step finer that the frequency step provided by the jammer transmitter synthesizer 68 may be provided via a jammer transmit DDS (direct digital synthesizer) 70. In order to achieve the finer frequency step resolution, the jammer integer-N synthesizer output is mixed with the output of the DDS using a frequency mixer 72 such as, for example, a quadrature modulator mixer configured to yield good sideband suppression. According to one embodiment, a calibrator and phase detector unit 74 calibrates the jammer transmit DDS 70 by setting the frequency of the DDS to match the frequency of the reference oscillator 52 (e.g. 10.23 MHz) via a command signal to the jammer transmit DDS. The calibrator and phase detector unit is further configured to align the phase of the DDS with the phase of the references oscillator 52, via, for example, a phase lock loop. Unlike the "alignment" of the reference oscillator, this results in physical alignment of the phase of the jammer transmitter. In this regard, if the node is an auxiliary node, the phase offset between the auxiliary node's reference oscillator and the master node's reference oscillator is taken into account to align the carrier phase of the DDS to the phase of the master node's reference oscillator.

After DDS phase alignment is achieved, the required DDS jammer frequency is synchronously set by the DDS calibration and phase detector unit using the known time of the rising edge of the reference oscillator square wave signal. The user clock time is determined, to less than 20 nanoseconds, as part of the GPS navigation solution. This enables an unambiguous time determination of each rising edge of the reference oscillator.

Figure 4:
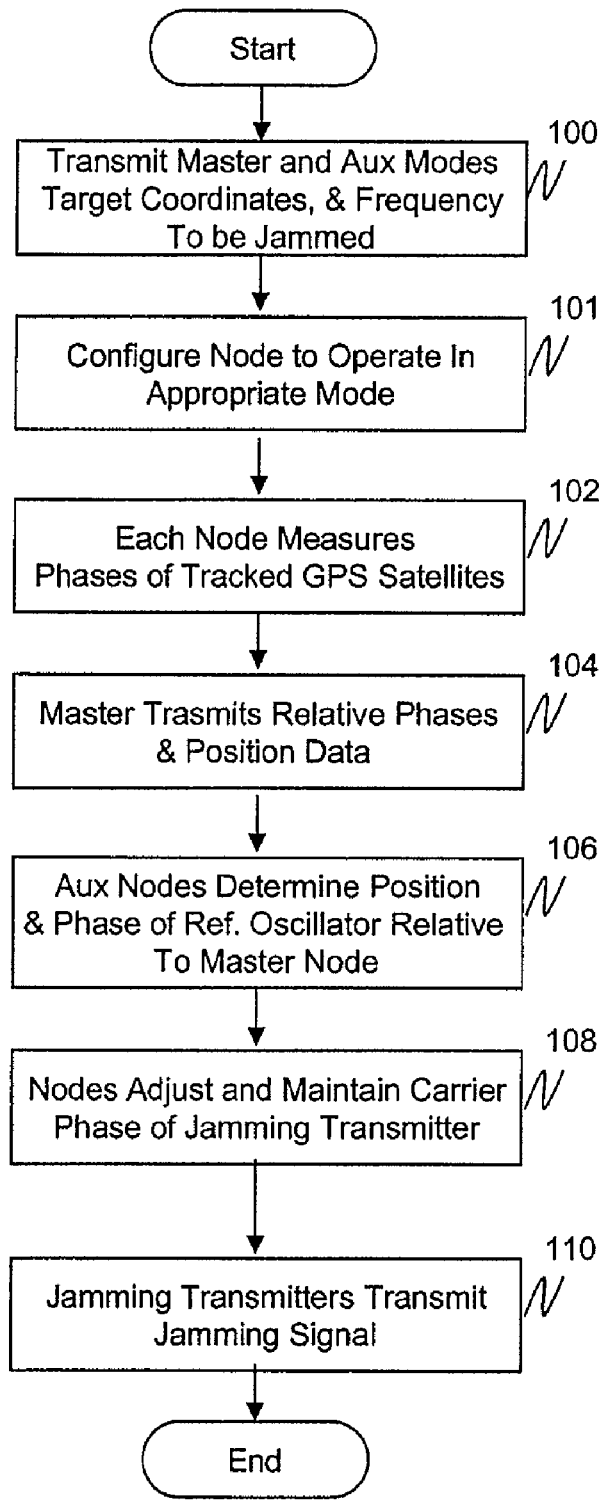
FIG. 4 is a flow diagram of a process for GPS aided surgical jamming according to one embodiment of the invention.

FIG. 4 is a flow diagram of a process for GPS aided surgical jamming according to one embodiment of the invention.

In step 100, the central control device 18 transmits to all the nodes of the array 10, geographic coordinates of the target device 12 (e.g. the target's latitude and longitude information), and the frequency to be jammed, as well as the device mode (i.e. master or auxiliary) selected for the node. In this regard, the memory of the central control device 18 includes computer program instructions that are configured to identify the nodes in the array 10, designate one of the nodes as the master node, and transmit mode identifier data over the data link 22 indicating that the node is a master node. According to one embodiment, a node that is located in the middle of the swarm of nodes is selected as the master node. Alternatively, the master node may be randomly selected. The program instructions are further configured to transmit mode identifier data to the remaining nodes indicating each of their status as an auxiliary node.

In step 101, the data receiver 54 in each node receives the mode identifier data from the central control device 18, and configures the node to operate in the mode indicated by the mode identifier data. If a node is identified as the master node then it configures itself to transmit (on its data transmitter 54), for example, once per second, the phase measurements of the tracked GPS satellites (PLL phases) in relation to its reference oscillator and its current GPS position, heading, and velocity. The master node does not have to adjust the carrier phase of its jamming transmitter. If a node is identified as an auxiliary node, then it configures itself to receive, using data receiver 54, the data transmissions from the master node. It further configures itself to execute the KCPT algorithm to determine its position relative to the master node and, using PLL measurements of the tracked GPS satellites, to determine the phase of its reference oscillator relative to the master nodes reference oscillator. It then adjusts the carrier phase, at the specified jamming frequency, of its jammer transmitter to enable coherent addition, at the target, of its jamming signal with the master node jamming signal.

In step 102, each node of the array 10 measures the carrier phases of the tracked GPS satellites 20 in relation to their own reference oscillator 52. In the regard, each GPS receiver 50 measures at a predetermined time period (e.g. a 1 second epoch time determined by a GPS time pulse), the carrier phases of the satellites 20 and translates the high frequency carrier phases to low frequency phase observations relative to the phase of its reference oscillator.

In step 104, the master node conveys the phase of its reference oscillator to all the auxiliary nodes by transmitting the PLL phase of the tracked satellites relative to the phase of the reference oscillator. The master node also transmits to the auxiliary nodes its GPS position, velocity, and heading information.

In step 106, each of the auxiliary nodes "align" the phase of its reference oscillator to the phase of the master node's reference oscillator. In this regard, each auxiliary node invokes its receiver processing logic 60 to execute the KCPT algorithm for determining the geographic position of the node relative to the master node based on the data provided by the master node. Based on this relative position information, the GPS receiver processing logic 60 back-calculates the phases of its tracked satellites to determine the phases that the node would see if the node were at the master node's location. Any difference in the back-calculated relative phases compared to the relative phases transmitted by the master node indicates that the auxiliary's reference oscillator is offset from the master node's reference oscillator by the detected difference.

In step 108, the auxiliary nodes adjust and maintain the carrier phase of their jamming transmitters based on the knowledge of the target location, their position relative to the master node, and the phase difference of their reference oscillator in relation to the master node's reference oscillator, to allow the nodes to accurately phase their jamming transmissions. The master node does not have to maintain or adjust the carrier phase of its jamming transmitter.

In step 110, the jamming transmitters 58 in both the master and auxiliary nodes transmit a jamming signal to coherently combine the transmitted energy at the target 12.

Figure 5:
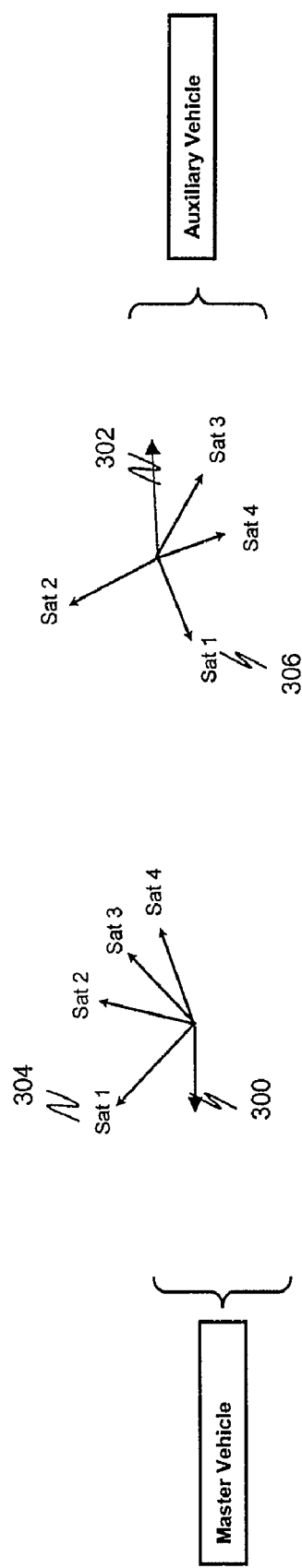
FIGS. 5A-5B are schematic diagrams of the relative carrier phases measured by a master node and an auxiliary node according to one example.

FIGS. 5A-5B are schematic diagrams of the relative carrier phases measured by the master node and an auxiliary node at a one-second measurement time according to one example. In the illustrated example, the master node observes particular phases 304 for its tracked satellites in reference to the phase 300 that is observed for its reference oscillator. The auxiliary node also observes particular phases 306 for its tracked satellites in reference to the phase 302 observed for it reference oscillator. Due to GPS timing error, the carrier phase measurements at the predetermined time period are not perfectly synchronized, and in fact, the measurements may be offset as much as 100 nanoseconds. Thus, if the transmitter phases of the jamming transmitters were to be synchronized based on GPS time, it would produce unacceptably high phase differences of the jamming transmitters. However, a GPS timing error of even 100 nanoseconds has a negligible impact when it comes to GPS satellite and reference oscillator phase measurements.

Figure 6:
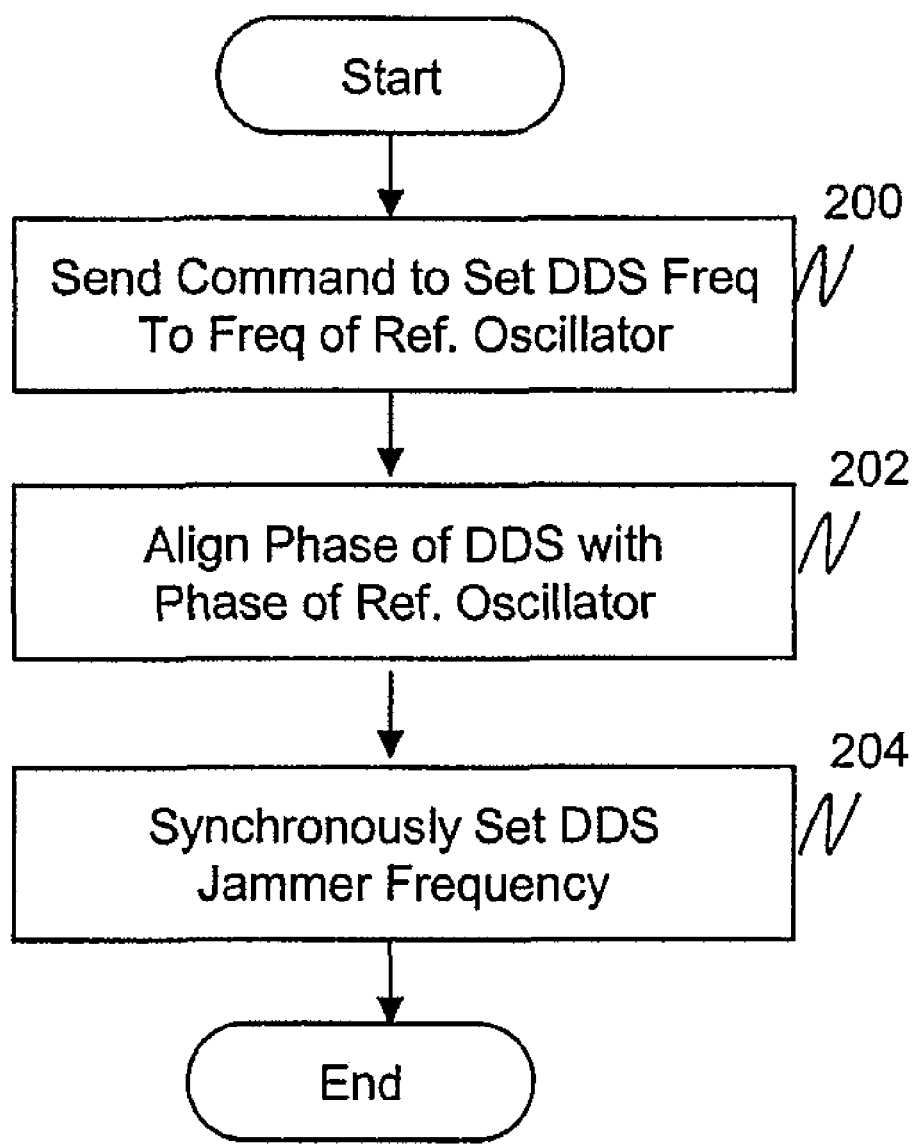
FIG. 6 is a more detailed flow diagram of adjusting and maintaining the carrier phases of jamming transmitters according to one embodiment of the invention.

FIG. 6 is a more detailed flow diagram of step 108 of adjusting and maintaining the carrier phases of the jamming transmitters at each of the nodes 14, 16 according to one embodiment of the invention. According to one embodiment, the jammer synthesizer may be adjusted, independently, in either phase or frequency (or both).

In step 200, the calibrator and phase detector unit 74 (FIG. 3) transmits a calibrate DDS command to the jammer transmit DDS 70. In response to the command, the jammer transmit DDS 70 sets its frequency to the same frequency as the reference oscillator 52 (e.g. 10.23 MHz).

In step 202, the calibrator and phase detector unit 74 aligns the carrier phase of the jammer transmit DDS 70 to the phase of its reference oscillator. According to one embodiment of the invention, the calibrator and phase detector unit 74 includes a phase lock loop for performing this alignment. In this regard, the phase of the jammer transmit DDS 70 is aligned to the phase of the auxiliary node's reference oscillator. Then, the DDS calibrator and phase detector unit 74 takes into account the phase difference with the master node's reference oscillator to further adjust the phase of the jammer transmit DDS 70 via a DDS phasing command. Additional DDS phasing commands are then issued to cause the phase coherent combining, at the target, of the auxiliary node's jamming signal with the master node's jamming signal.

In step 204, the required DDS jammer frequency is synchronously set using the known time of the rising edge of the reference oscillator square wave signal. There is no ambiguity in the output phase of the transmit synthesizer, for any selected output frequency, since the rising edge of the synthesizer output signal is aligned with the rising edge of the 10.23 MHz reference oscillator.

Figure 7B:
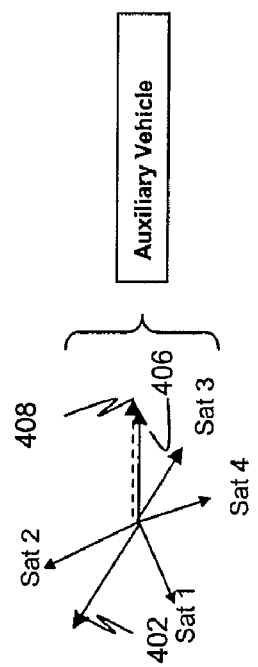
FIGS. 7A-7B are schematic block diagrams of calibration of jammer transmit DDS in a master node and a particular auxiliary node according to one example.
Figure 7A:
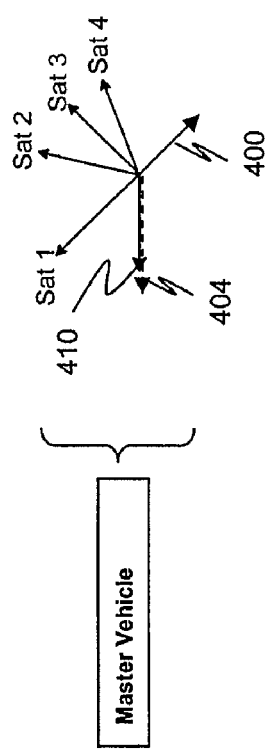

FIGS. 7A-7B are schematic block diagrams of calibration of the jammer transmit DDS 70 in the master node and a particular auxiliary node according to one example. The jammer transmit DDS phase 400 of the master vehicle is aligned to the phase 404 of its reference oscillator to output an aligned jammer transmit phase 410. Similarly, the jammer transmit DDS phase 402 of the auxiliary vehicle is aligned to the phase 406 of its reference oscillator to output an aligned jammer transmit phase 408.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for generating jamming signals from a plurality of nodes, wherein one of the plurality of nodes is designated as a master node and remaining ones of the plurality of nodes are designated as auxiliary nodes, wherein each of the plurality of nodes includes a GPS receiver, reference oscillator, frequency synthesizer, and signal transmitter, the method comprising:

measuring via the GPS receiver in each of the plurality of nodes, carrier phases of satellite signals transmitted by a plurality of GPS satellites relative to a carrier phase of the reference oscillator in the respective node;

providing by the master node to the auxiliary nodes, data relating to the measured carrier phases of the plurality of GPS satellites and position information of the master node;

determining by each of the auxiliary nodes based on the data from the master node, a difference of the phase of the reference oscillator of the auxiliary node relative to the phase of the reference oscillator in the master node;

aligning a transmit phase of the transmitter in each of the auxiliary nodes based on the determined phase difference; and transmitting by each of the plurality of nodes a jamming signal directed to a remote target based on the aligned transmit phase, wherein energy from the jamming signals are configured to be combined at the remote target for disrupting communication or navigation of the remote target.

2. The method of claim 1, wherein the determining of the difference of the phase includes determining by each of the auxiliary nodes a position of the auxiliary node relative to the master node.

3. The method of claim 2, wherein the determining of the position is based on kinematic carrier phase tracking of the satellite signals.

4. The method of claim 1, wherein the plurality of nodes measure the carrier phases of the satellite signals at a predetermined GPS time period determined by the GPS receiver.

5. The method of claim 1, wherein the transmitter in each of the plurality of nodes includes a phase lock loop frequency synthesizer driven by the reference oscillator in the node.

6. The method of claim 1, wherein the GPS receiver in each of the plurality of nodes includes a phase lock loop to track the carrier phases of the satellite signals driven by the reference oscillator in the node.

7. The method of claim 1, wherein the reference oscillator outputs a signal at a frequency of 10.23 MHz.

8. A communications node for generating jamming signals comprising:
a data receiver for receiving from a master node, data relating to measured carrier phases of a plurality of GPS satellites relative to a carrier phase of a first reference oscillator in the master node, and position information of the master node;
a second reference oscillator generating a second reference signal at a predetermined frequency;
a GPS receiver coupled to the data receiver and the second reference oscillator, the GPS receiver including logic for:
measuring carrier phases of satellite signals transmitted by the plurality of GPS satellites relative to a carrier phase of the second reference oscillator; and
determining, based on the data from the master node, a difference of a phase of the second reference oscillator relative to a phase of the first reference oscillator in the master node;
a jammer frequency synthesizer coupled to the GPS receiver and the second reference oscillator, the jammer frequency synthesizer including logic for aligning a transmit phase based on the determined phase difference; and
a transmitter coupled to the jammer frequency synthesizer for transmitting a jamming signal directed to a remote target based on the aligned transmit phase, wherein energy from the jamming signal is configured to be combined at the remote target with energy from one or more jamming signals from one or more other nodes for disrupting communication or navigation of the remote target.

9. The communications node of claim 8, wherein the determining of the difference of the phase includes determining a position of the node relative to the master node.

10. The communications node of claim 9, wherein the determining of the position is based on kinematic carrier phase tracking of the satellite signals.

11. The communications node of claim 8, wherein the GPS receiver is configured to measure the carrier phases of the satellite signals at a predetermined GPS time period.

12. The communications node of claim 8, wherein the transmitter includes a phase lock loop frequency synthesizer driven by the first reference oscillator.

13. The communications node of claim 8, wherein the GPS receiver includes a phase lock loop to track the carrier phases of the satellite signals driven by the second reference oscillator.

14. The communications node of claim 8, wherein the first and second reference oscillators output outputs a signal at a frequency of 10.23 MHz.

* * * * *

UNITED STATES PATENT AND TRADEMARK OFFICE
CERTIFICATE OF CORRECTION

| | | |
|---|---|---|
| PATENT NO. | : 8,391,772 B2 | Page 1 of 1 |
| APPLICATION NO. | : 12/777215 | |
| DATED | : March 5, 2013 | |
| INVENTOR(S) | : Paul H. Grobert et al. | |

It is certified that error appears in the above-identified patent and that said Letters Patent is hereby corrected as shown below:

In the Specification

Col. 1, lines 3-4, above the FIELD OF THE INVENTION paragraph, please insert the following paragraph:

--STATEMENT REGARDING FEDERALLY SPONSORED RESEARCH OR DEVELOPMENT
This Invention was made with Government support under N66001-10-C-2005 awarded by The Department of the Navy. The Government has certain rights in this invention.--

Signed and Sealed this
Third Day of June, 2014

Michelle K. Lee
*Deputy Director of the United States Patent and Trademark Office*